May 8, 1951  C. B. STADUM  2,551,856
ELECTRONIC TIMING SYSTEM
Filed April 19, 1950

WITNESSES:
Robert C. Baird
Wm. T. Wofford

INVENTOR
Clarence B. Stadum.
BY
Hymen Diamond
ATTORNEY

Patented May 8, 1951

2,551,856

UNITED STATES PATENT OFFICE 2,551,856

ELECTRONIC TIMING SYSTEM

Clarence B. Stadum, Buffalo, N. Y., assignor to Westinghouse Electric Corporation, East Pittsburgh, Pa., a corporation of Pennsylvania Application April 19, 1950, Serial No. 156,816

7 Claims. (Cl. 161—15)

My invention relates to electronic timing systems and particularly to such a system designed for precise measurement of the duration of the flow of power being supplied intermittently at a varying rate from an alternating current source to a load, for an operating cycle of the load.

My invention is especially applicable for measurement of "Weld Time" in certain types of welding apparatus. In some types of modern welding apparatus, the rate of flow of power into the primary of the welding transformer is controlled by varying the firing points of gaseous electric discharge devices which are interposed inversely in parallel in series with a primary winding of the welding transformer. In order to ascertain whether the welding apparatus is in proper adjustment, it is necessary to have some means for precise measurement of "Weld Time," that is the time during which power is delivered to the welding load during one operational cycle of the welding apparatus. It has been common practice in the prior art of which I am aware to determine "Weld Time" by making an oscillogram of the welding current. However, when the welding time consists of 200 to 300 cycles of welding current as is often the case, it becomes extremely laborous to determine the "Weld Time" with an oscillograph or similar instruments. Another method which has been used to determine "Weld Time" in the prior art of which I am aware utilizes a counting device which is actuated responsive to welding current flow. Such counting devices do not operate satisfactorily on reduced magnitudes of welding current. In other words, they are sensitive to heat control.

It is, accordingly, an object of my invention to provide an improved system for precise measurement of the duration of the flow of power which is being supplied intermittently and at a varying rate from an alternating current source to a load device, for an operating cycle of the load.

It is another object of my invention to provide an improved system for precise measurement of the "Weld Time" in welding apparatus of the type in which power is supplied intermittently and at a variable rate from an alternating current source to a welding load.

It is another object of my invention to provide an improved system in which "Weld Time" can be read directly from a counting device.

It is a further object of my invention to provide a system for precise measurement of "Weld Time" and which is insensitive to heat control.

A further object of my invention is to provide a system which is operable for precise measurement of "Weld Time" irrespective of the magnitude of the welding current.

A still further object of my invention is to provide an electronic system for measurement of "Weld Time" which shall avoid the use of a plurality of relays.

In accordance with the broad aspects of my invention, I provide a novel system for direct reading measurement of the duration of power flow to a load device in apparatus in which the rate of power flow from an alternating current source to the load device may be controlled by varying the firing times of gaseous electric discharge devices which are interposed in series with the load. More specifically, my system comprises a gaseous electric discharge device of the type having an anode, a cathode and a control electrode. An alternating current voltage which is a function of the supply voltage is applied across the anode and cathode of the discharge device. A cut-off bias is applied on the control element to maintain the discharge device normally non-conductive. A voltage which is a function of the voltage across the load device and which is in phase with the anode voltage of the discharge device is applied to the control element of the discharge device, to render the discharge device conductive at the same time in its anode voltage positive half period so long as there is power flow through the load. A direct reading counting means is connected in the anode circuit of the discharge device so as to be actuated responsive to conduction of the discharge device.

My invention will be best understood from the following description of a specific embodiment thereof, read in connection with the accompanying drawing, in which.

Figure 1:
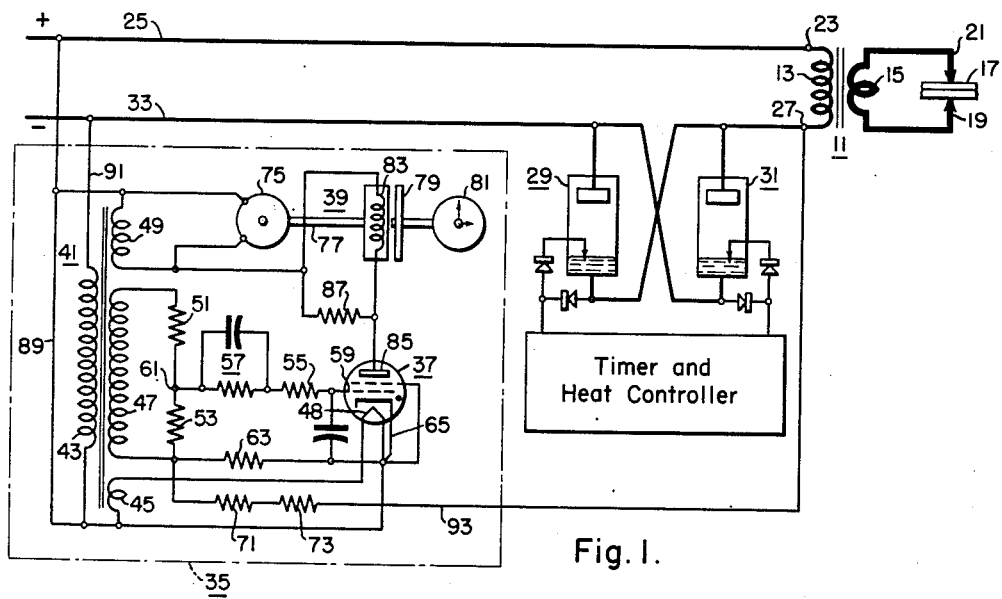
Figure 1 is a schematic diagram of a preferred embodiment of my invention.

In Fig. 1 of the drawing I have illustrated my invention as it may be applied to measure the "Weld Time" in single-phase electronic welding apparatus. Such welding apparatus may comprise a welding transformer 11 having a primary winding 13 and a secondary winding 15. The material 17 to be welded is placed between the welding electrodes 19, 21 which are connected in series with the secondary winding 15 of the welding transformer 11. The upper terminal 23 of the welding transformer primary winding 13 is shown connected to a first power supply bus 25.

The lower terminal 27 of the welding transformer primary winding 13 is connected in series with a pair of ignitrons 29, 31 which are connected inversely in parallel to a second power supply bus 33. The power supply buses 25, 33 may be connected to a suitable commercial source of alternating current, not shown. Conventional apparatus for controlling the ignitrons is designated by the block labeled "Timer and Heat Controller." The time indicating apparatus indicated generally at 35 comprises an electric discharge device 37, a counting mechanism 39 and a power supply transformer 41. The power supply transformer 41 has a primary winding 43, which is connected across the power supply buses 25, 33, and three secondary windings 45, 47, 49. The lower secondary winding 45 of the supply transformer 41 is connected in series with the heater element 48 of the electric discharge device 37. The center secondary winding 47 is shunted by first and second resistors 51, 53. A current limiting resistor 55 is connected in series with a paralleled resistor capacitor network 57 between the control element 59 of the discharge device 37 and the junction 61 of the first and second resistors 51, 53. A third resistor 63 is connected between the cathode 65 of the discharge device 37 and a point common to the center secondary winding 47 and the second resistor 53. A connection is made from said last-mentioned point through fourth and fifth resistors 71, 73 to the lower terminal 27 of the welding transformer primary winding 13. The counting mechanism 39 includes a motor 75 having a shaft 77 adapted for engagement by a clutch 79 to a clock-type indicator 81. The clutch 79 is actuated by a solenoid coil 83. The motor 75 is continuously energized by connection across the upper secondary winding 49 of the power supply transformer 41. Anode voltage is supplied to the electric discharge device 37 by a circuit which may be traced from the anode 85 of the discharge device through a resistor 87 in shunt with the solenoid coil 83 through the upper secondary winding 49 of the power supply transformer 41 to the first power supply bus 25 and the cathode 65 of the discharge device 37.

For operation of the system according to my invention, the output leads 89, 91, 93 of the timing device are connected to the welding apparatus, as shown in Fig. 1. The discharge device 37 is initially biased to cut-off by grid rectification due to the alternating voltage applied across the second resistance 53 in series with the paralleled resistor capacitor network 57 in the grid circuit of the discharge device 37. Alternating current anode voltage is applied to the discharge device from the upper secondary winding 49 of the power supply transformer 41. Upon initiation of current flow through the primary winding 13 of the welding transformer, an alternating current voltage is applied across the third resistance 63 in the grid circuit of the discharge device 37. This voltage is derived from a connection across the welding transformer primary winding 13. When the total grid voltage on the discharge device 37 becomes positive, it conducts to energize the solenoid 83, which causes engagement of the clutch 79 to start the indicator 81. The solenoid 83 will then remain energized until the welding current is terminated, at which time the discharge device 37 is rendered non-conductive and the solenoid 83 deenergized to disengage the clutch 79 and stop the indicator 81.

Figure 2:
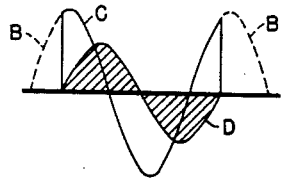
Figs. 2, 2A, 3, 3A, 4 and 4A are curves showing the relationship of various parameters for different magnitudes of load current, in the circuit of Fig. 1.
Figure 3:
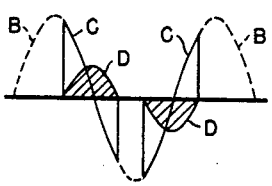
Figure 4:
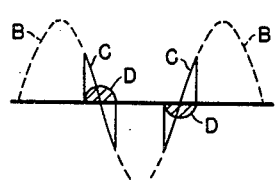
Figure 2A:
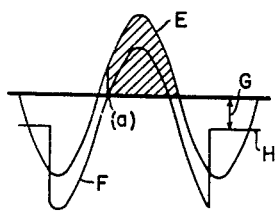
Figure 3A:
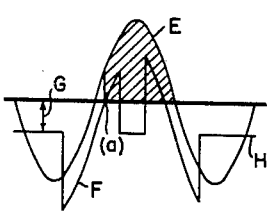
Figure 4A:
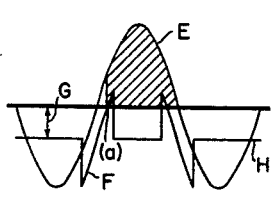

A principal feature of the system of my invention is that it is insensitive to heat control, that is to say that operation of the counting mechanism is positive and devoid of stuttering regardless of the magnitude of welding current. The operation of this feature may be illustrated by reference to the curves of Figs. 2 through 4A. Voltage and current is plotted as the ordinate and time as the abscissa. In these figures curves B represent the line voltage of the power supply; curves C represent the welding transformer primary voltage; curves D the welding current; curves H located at distance G below the abscissa the cut-off bias on the discharge device; curves E the anode voltage of the discharge device 37; and curve F is the total grid voltage of the discharge device 37. Figs. 2 and 2A represent the condition where maximum heat is being supplied to the welding load; Figs. 3 and 3A the condition of 50% heat; and Figs. 4 and 4A represent the condition of 20% heat. The shaded portion under curve E represents the time during which the discharge device 37 is conductive. By inspection of these curves it will be noted that the discharge device 37 begins conducting at the same point (a) in its anode voltage half period whether the apparatus is set for maximum heat, 50% heat, or 20% heat. This, of course, would hold true also for any other percentage of heat. Since the discharge device always becomes conductive early in its anode voltage half-period, it will deliver substantially maximum power to the solenoid to give positive operation of the indicator device. This same positive operation is obtained regardless of the percent heat being delivered to the welding load.

Another feature of the system of my invention is that the time indicating apparatus 35 is provided with only three input leads. These leads may be of the clip type and can be conveniently connected to measure the "Weld Time" of any suitable welding apparatus. The power supply transformer 41 may be tapped so that the apparatus 35 can be used directly on conventional 460 or 230 volt commercial power supplies.

The indicator 81 may be calibrated to read directly in seconds or cycles as desired. I have found that my system is accurate within the plus or minus one-half cycle for welding schedules running more than 10 cycles.

While I have shown and described a specific embodiment of my invention, I am aware that various modifications thereof will appear to those skilled in the art. For example, my system may be used on three-phase welding apparatus as well as single phase. The input leads to my timing device may be connected in a manner different from that shown in Fig. 1 so long as the proper voltage relationships on the discharge device are maintained.

I claim as my invention:

1. A system for measuring the weld time in welding apparatus of the type including a welding transformer primary winding connected to one phase of an alternating current power source, and means interposed in series with said winding for controlling the flow of power to said winding, said system comprising an electric discharge device having an anode, a cathode, and a grid electrode, means for applying alternating current anode voltage substantially 180° out of phase with the source voltage to said discharge device, means for applying a cut-off bias to the grid of said discharge device, means for applying a voltage derived from said transformer primary winding to said grid in a sense such that said last-mentioned voltage will be in phase with the anode voltage of said discharge device, and counting means connected in the anode circuit of said discharge device so as to be responsive to conduction of said discharge device.

2. A system for measuring the weld time in welding apparatus of the type in which pulsating current is supplied intermittently to a welding load, said system comprising an electric discharge device having an anode, a cathode, and a grid electrode, means for supplying to the anode of said discharge device a voltage which is a function of the voltage across said welding load, means for supplying a cut-off bias to the grid of said discharge device, means for applying to the grid of said discharge device a voltage which is a function of the voltage across said welding load and in phase with said anode voltage, and counting means connected in the anode circuit of said discharge device so as to be responsive to conduction of said discharge device.

3. A system for precise measurement of the duration of power flow to an inductive load device wherein the rate of power flow from an alternating current source to said load device is selectively controlled by varying the firing times of a plurality of gaseous electric discharge devices which are interposed in series with said load, said system comprising an electric discharge device having an anode, a cathode, and a grid electrode, means for supplying to the anode of said discharge device a voltage which is a function of the voltage appearing across said load, means for applying a cut-off bias to the grid of said discharge device, means for applying to the grid of said discharge device a voltage which is a function of the voltage across said load and in phase with the anode voltage on said discharge device, and counting means connected in the anode circuit of said discharge device so as to be responsive to conduction of said discharge device.

4. A system for precise measurement of the duration of power flow to an inductive load device wherein the rate of power flow from an alternating current source to said load device is selectively controlled by varying the firing times of a plurality of gaseous electric discharge devices which are interposed in series with said load, said system comprising a gaseous electric discharge device having an anode, a cathode, and a grid electrode, means for supplying to the anode of said discharge device a voltage which is a function of the voltage appearing across said load, means for applying a cut-off bias to the grid of said discharge device, means for applying to the grid of said discharge device a voltage which is a function of the voltage across said load and in phase with the anode voltage on said discharge device, and counting means connected in the anode circuit of said discharge device so as to be responsive to conduction of said discharge device.

5. A system for measurement of the weld time in welding apparatus of the type in which a welding transformer primary winding is supplied intermittently and at a controllable rate with power from an alternating current source by means of a pair of gaseous electric discharge devices interposed inversely in parallel in series with said winding, said system comprising a thyratron having an anode, a cathode and a control electrode, means for applying alternating current anode voltage substantially 180° out of phase with the voltage of said source, means for applying a cut-off bias to said control electrode, means for applying a voltage derived from said transformer primary winding to said control electrode in a sense such that said last-mentioned voltage will be in phase with the anode voltage of said thyratron, and counting means connected in the anode circuit of said thyratron so as to be responsive to conduction of said thyratron.

6. A system for measurement of the weld time in welding apparatus of the type in which a welding transformer primary winding is supplied intermittently and at a controllable rate with power from an alternating current source by means of a pair of gaseous electric discharge devices interposed inversely in parallel in series with said winding, said system comprising a thyratron having an anode, a cathode and a control electrode, a transformer having a primary winding connected across said alternating current source, and a secondary winding connected to supply anode voltage to said thyratron, means to supply a cut-off bias to the control electrode of said thyratron, a network connected in the control electrode circuit of said thyratron, conductors connecting said winding to said network in a sense such that the alternating current voltage developed for superposition on said cut-off bias will be in phase with the anode voltage of said thyratron, and counting means connected in the anode-cathode circuit of said thyratron so as to be actuated responsive to conduction of said thyratron.

7. In a system for measuring the weld time in welding apparatus of the type in which a primary winding of the welding transformer is connected in series with a pair of controllable inversely paralleled gaseous electric discharge devices across the buses of a phase of an alternating current power supply, a timing device having a first input lead connected to one power supply bus on the power supply side of said discharge devices, a second input lead connected on the transformer primary side of said discharge devices, a third input lead connected to the other power supply bus, a thyratron having an anode, a cathode and a grid, means connected across said first and third input leads for supplying to the anode of said thyratron a voltage which is a function of the voltage across the welding load, means connected across said first and third input leads for supplying a cut-off bias to the grid of said thyratron, means connected across said second and third input leads for supplying to the grid of said thyratron a voltage which is a function of the voltage across the welding load and in phase with said anode voltage, and counting means connected in the anode circuit of said thyratron so as to be responsive to conduction of said thyratron.

CLARENCE B. STADUM.

No references cited.